(12) United States Patent　(10) Patent No.: US 11,527,785 B2
Taniuchi et al.　(45) Date of Patent: Dec. 13, 2022

(54) BATTERY PACK

(71) Applicant: HONDA MOTOR CO., LTD., Tokyo (JP)

(72) Inventors: Takuya Taniuchi, Saitama (JP); Masahiro Ohta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 17/100,957

(22) Filed: Nov. 23, 2020

(65) Prior Publication Data

US 2021/0184279 A1　Jun. 17, 2021

(30) Foreign Application Priority Data

Dec. 16, 2019　(JP) .............................. JP2019-226692

(51) Int. Cl.
*H01M 10/48*　(2006.01)
*H01M 10/0525*　(2010.01)
*H01M 10/0562*　(2010.01)
*H01M 50/20*　(2021.01)

(52) U.S. Cl.
CPC ..... *H01M 10/482* (2013.01); *H01M 10/0525* (2013.01); *H01M 10/0562* (2013.01); *H01M 50/20* (2021.01); *H01M 2300/0065* (2013.01)

(58) Field of Classification Search
CPC ........... H01M 10/482; H01M 10/0525; H01M 10/052; H01M 10/0562; H01M 10/0561; H01M 10/056; H01M 10/058; H01M 10/0585; H01M 50/20; H01M 2300/0065
See application file for complete search history.

(56) References Cited

U.S. PATENT DOCUMENTS

| | | | |
|---|---|---|---|
| 2017/0106758 A1 | 4/2017 | Sakatani et al. | |
| 2017/0317334 A1* | 11/2017 | Yura | .................. H01M 10/052 |
| 2018/0198169 A1* | 7/2018 | Fukui | ...................... H01M 4/64 |
| 2018/0366700 A1 | 12/2018 | Tsutsui et al. | |
| 2018/0375151 A1* | 12/2018 | Gaben | .................. H01M 4/139 |

FOREIGN PATENT DOCUMENTS

| | | |
|---|---|---|
| JP | 2019003930 A | 1/2019 |
| WO | 2015015743 A1 | 2/2015 |

\* cited by examiner

*Primary Examiner* — Raymond Alejandro
(74) *Attorney, Agent, or Firm* — CKC & Partners Co., LLC

(57) ABSTRACT

Provided is a battery pack having excellent energy density and durability.
A battery pack 100 includes solid-state battery modules 102 each configured such that a plurality of solid-state battery cells containing a solid electrolyte is stacked and electrolytic solution-based battery modules 32 each configured such that a plurality of electrolytic solution-based battery cells containing an electrolytic solution is stacked, the solid-state battery modules 102 and the electrolytic solution-based battery modules 32 being combined and housed in the pack. The solid-state battery modules 102 are arranged to surround the electrolytic solution-based battery modules 32.

11 Claims, 5 Drawing Sheets

BATTERY PACK

This application is based on and claims the benefit of priority from Japanese Patent Application No. 2019-226692, filed on 16 Dec. 2019, the content of which is incorporated herein by reference.

BACKGROUND OF THE INVENTION

Field of the Invention

The present invention relates to a battery pack.

Related Art

Typically, a power source system including a combination of batteries with different properties has been known.
PCT International Publication No. WO2015/015743 discloses a hybrid power source including a secondary battery other than a lead storage battery and a capacitor and a highly-reliable vehicle power source system configured such that a lead storage battery is further connected in parallel with the hybrid power source.
Patent Document 1: PCT International Publication No. WO2015/015743

SUMMARY OF THE INVENTION

Each of batteries with different properties has an available temperature range.
Particularly, performance of a battery using an electrolytic solution as an electrolyte greatly depends on a temperature of the electrolytic solution, and for this reason, such a battery requires fine temperature management.
Thus, upon combination of an electrolytic solution-based battery and other batteries, a temperature adjustment system tends to become complicated and increased in size.

The present invention has been made in view of the above-described problems, and an object of the present invention is to simplify a temperature adjustment system to improve an energy density and durability in a battery pack including a combination of a lithium ion battery and other batteries.

(1) The present invention provides a battery pack (e.g., a later-described battery pack 100) including a solid-state battery module (e.g., a later-described solid-state battery module 102) configured such that a plurality of solid-state battery cells containing a solid electrolyte is stacked and an electrolytic solution-based battery module (e.g., a later-described electrolytic solution-based battery module 32) configured such that a plurality of electrolytic solution-based battery cells containing an electrolytic solution is stacked, the solid-state battery module and the electrolytic solution-based battery module being combined and housed in the pack and the solid-state battery module being arranged to surround the electrolytic solution-based battery module.

According to the aspect (1) of the invention, an available temperature range for a solid-state battery is broad, and it is sufficient to cool an electrolytic solution-based battery portion. Thus, a temperature adjustment system in the battery pack can be simplified and downsized as compared to a battery pack only including an electrolytic solution-based battery.
With this configuration, the energy density of the battery pack can be improved, and the durability thereof can be improved.

(2) In the aspect (1) of the invention, the solid-state battery module is arranged under vacuum environment.
According to the aspect (2) of the invention, the thermal insulation performance of the solid-state battery module is improved, and therefore, influence of an external air temperature is reduced. With this configuration, starting performance is improved in a cold region, and degradation is reduced in a tropical region.
Further, output relating to temperature adjustment can be reduced, and therefore, the temperature adjustment system can be more simplified.

(3) In the aspect (1) or (2) of the invention, the solid-state battery module is a high-output battery module, and the electrolytic solution-based battery module is a high-capacity battery module.
According to the aspect (3) of the invention, the battery modules arranged inside and outside are separated by type, and upon high output or rapid charging, the solid-state battery module as the high-output battery module is preferentially used.
The solid-state battery module is preferentially used, and therefore, the heat generation amount of the electrolytic solution-based battery module can be reduced and degradation of such a module can be prevented.
Further, the solid-state battery module is arranged outside and exhibits high performance for releasing heat to external air, and therefore, influence of heat transfer from the solid-state battery module to the electrolytic solution-based battery module is also small.

(4) In the aspects (1) to (3) of the invention, the battery pack further includes a solid-state battery module layer (e.g., a later-described solid-state battery module layer 110) including a first space (e.g., a later-described first space 115) and a plurality of solid-state battery modules arranged in the first space, and an electrolytic solution-based battery module layer (e.g., a later-described electrolytic solution-based battery module layer 130) including a second space (e.g., a later-described second space 135) and the electrolytic solution-based battery module arranged in the second space. The solid-state battery module layer is arranged and stacked on the electrolytic solution-based battery module layer, and the first space has a support portion (e.g., a later-described support portion 106) supporting the first space at least in a stacking direction of the solid-state battery module layer.

According to the aspect (4) of the invention, the strength of the first space can be improved, even damage due to, e.g., impact from the outside can be reduced, and electrolytic solution leakage from the electrolytic solution-based battery module can be prevented.
That is, the durability and safety of the battery pack are improved.

(5) In the aspect (4) of the invention, the support portion has a solid-state battery.
According to the aspect (5) of the invention, the volume of the solid-state battery in the battery pack can be increased, and therefore, the energy density of the battery pack is improved.

According to the present invention, in the battery pack, the temperature adjustment system can be simplified to improve the energy density and the durability.

DETAILED DESCRIPTION OF THE INVENTION

For describing features and advantageous effects of the present invention, a typical electrolytic solution-based battery pack 10 having the same basic configuration as that of the present invention will be first described.

Figure 1:
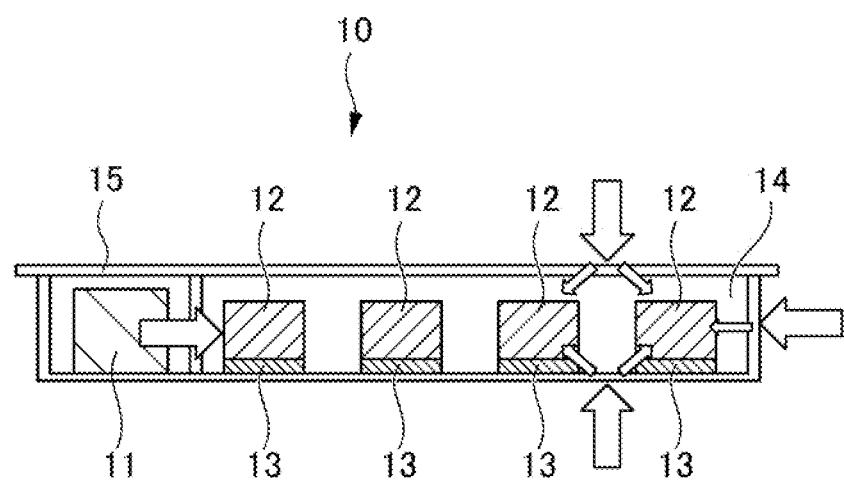
FIG. 1 is a view showing a typical battery pack 10 sealed with air 14.

FIG. 1 is a sectional view showing a configuration of the electrolytic solution-based battery pack 10 sealed with atmospheric air 14 in a typical assembly environment.

The battery pack 10 has a box-shaped casing 15, a plurality of electrolytic solution-based battery modules 12 housed in the casing 15, temperature adjustment systems 13 arranged among the electrolytic solution-based battery modules 12 and the casing 15, the atmospheric air 14 in the assembly environment, and other accessories 11.

The accessories 11 are equipment such as a contactor, a DC/DC converter, and an equalization circuit, and generate heat due to use of the battery.

The electrolytic solution-based battery module 12 is configured such that a plurality of electrolytic solution-based battery cells containing an electrolytic solution is stacked. The type of electrolytic solution-based battery cell is not particularly limited, and may be a laminated cell or a metal can cell. The electrolytic solution-based battery module 12 is sealed with air, and therefore, the temperature thereof changes due to influence of heat generated from the accessories 11 and an external air temperature.

When the electrolytic solution reaches a high temperature, desired battery performance cannot be obtained, and such a high-temperature state leads to degradation of the electrolytic solution-based battery itself.

In a cold region, when the electrolytic solution reaches a low temperature, the internal resistance of the battery increases, leading to a start delay and degradation in responsiveness.

Figure 2A:
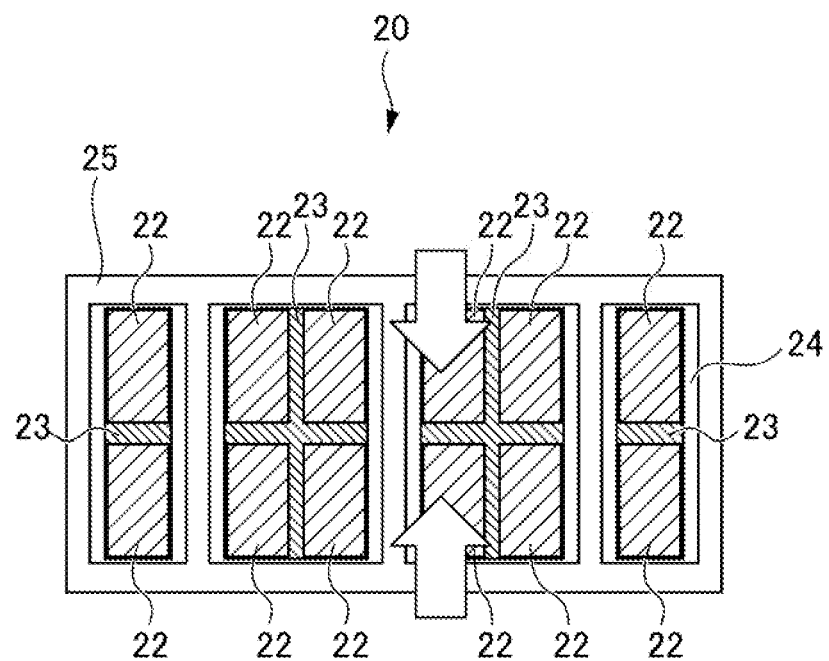
FIGS. 2A and 2B are views showing a typical battery pack 20 having electrolytic solution-based battery modules 22.
Figure 2B:
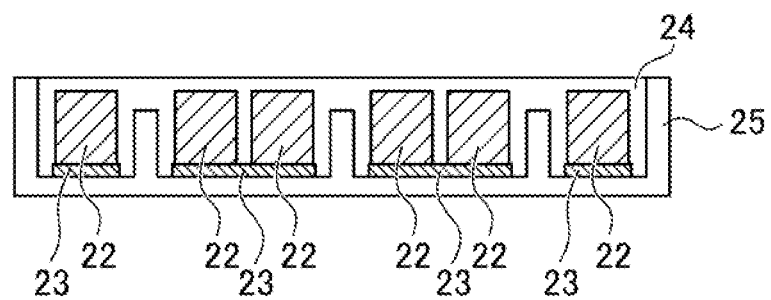

FIGS. 2A and 2B are views showing a typical battery pack 20 having electrolytic solution-based battery modules 22. The battery pack 20 includes temperature adjustment systems 23 configured to hold the temperatures of the electrolytic solution-based battery modules 22 within a certain range. However, as more electrolytic solution-based battery modules 22 are, for increasing a battery capacity, housed to enrich the temperature adjustment systems 23, the battery pack 20 increases in size and weight and decreases in energy density.

For example, in the battery pack 20 shown in FIGS. 2A and 2B, the temperature adjustment system 23 is larger than the electrolytic solution-based battery module 22 in some cases.

Hereinafter, embodiments of the present invention will be described in detail with reference to the drawings, but the invention of the present application is not limited to the following embodiments.

First Embodiment

A battery pack 100 according to a first embodiment of the present invention has a plurality of solid-state battery module layers 110 and an electrolytic solution-based battery module layer 130.

The electrolytic solution-based battery module layer 130 is interposed and arranged between the plurality of solid-state battery module layers 110.

Figure 3A:
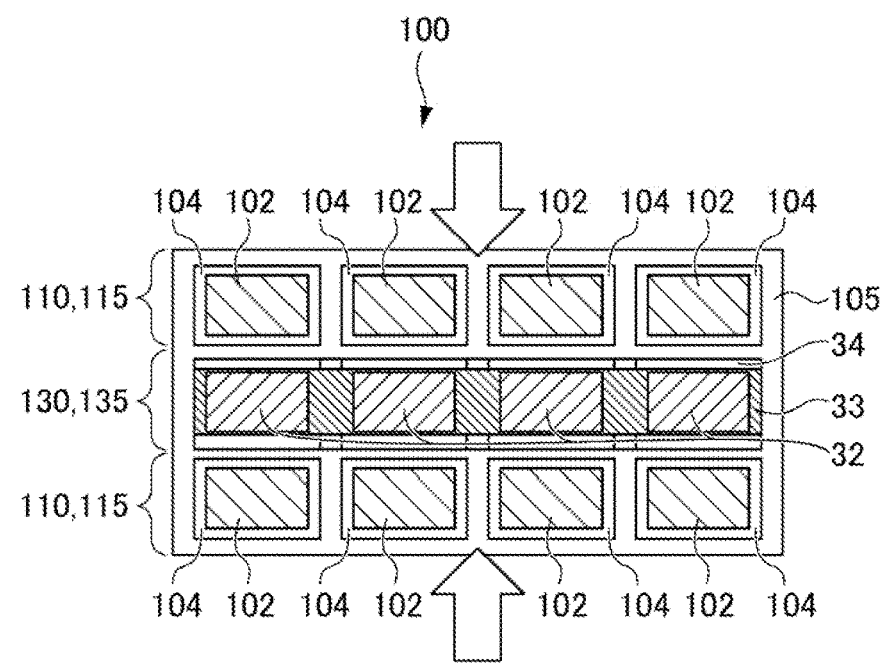
FIGS. 3A to 3C are views showing a battery pack 100 according to a first embodiment of the present invention.
Figure 3B:
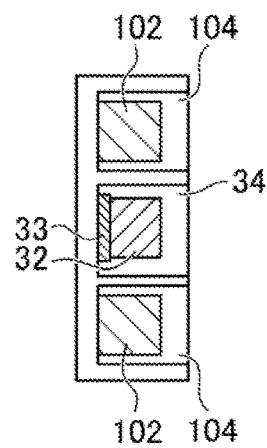
Figure 3C:
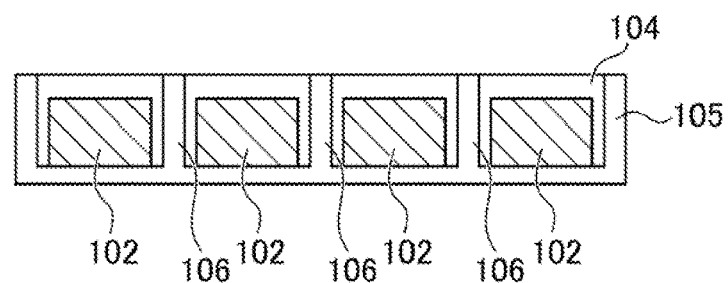

FIGS. 3A to 3C are views showing a configuration of the battery pack 100 according to the first embodiment of the present invention. FIGS. 3A to 3C do not show accessories 101.

The battery pack 100 has a rectangular casing 105 as shown in FIGS. 3A to 3C, for example.

The casing 105 has the plurality of solid-state battery module layers 110 housing solid-state battery modules 102 and the electrolytic solution-based battery module layer 130 housing electrolytic solution-based battery modules 32.

The casing 105 is, for example, formed as a metal box.

The electrolytic solution-based battery module layer 130 has the electrolytic solution-based battery modules 32, a temperature adjustment system 33, and atmospheric air 34 in the assembly environment, and is formed as in the typical battery pack 10 shown in FIG. 1.

The solid-state battery module 102 is configured such that a plurality of solid-state battery cells is stacked inside.

Unlike the typical battery pack 10 shown in FIG. 1, the solid-state battery module layer 110 includes the solid-state battery modules 102 instead of the electrolytic solution-based battery modules 12.

An available temperature range for the solid-state battery module 102 is broad, and it is sufficient to cool the electrolytic solution-based battery module 32. Thus, the temperature adjustment system 33 is only arranged in the electrolytic solution-based battery module layer 130.

That is, the solid-state battery modules 102 and the electrolytic solution-based battery modules 32 are used in combination, and therefore, the temperature adjustment system 33 can be simplified and downsized as compared to the battery pack 10 only including the electrolytic solution-based battery modules 12.

With this configuration, the energy density of the battery pack 100 can be improved, and the durability thereof can be improved.

It may only be required that the solid-state battery module layer 110 is arranged on at least one side of the electrolytic solution-based battery modules 32.

Further, the inside of the casing 105 is vacuumized.

In terms of preventing electrolytic solution leakage, it is difficult to vacuumize the inside of the casing 15 in which the electrolytic solution-based battery modules 12 are housed.

Use of the solid-state battery modules 102 allows vacuumization of the inside of the casing 105 for the solid-state battery module layers 110.

The inside of the casing 105 for the solid-state battery module layers 110 is vacuumized, and therefore, thermal insulation performance is improved.

With this configuration, the electrolytic solution-based battery module layer 130 sandwiched between the plurality of solid-state battery module layers 110 is also thermally insulated by the solid-state battery module layers 110, and is less susceptible to an influence of external air temperature. Thus, the battery pack 100 is less susceptible to the influence of the external air temperature, and starting performance is improved in a cold region and degradation is reduced in a tropical region.

Further, output relating to temperature adjustment can be reduced, and therefore, the temperature adjustment system 33 can be more simplified.

Figure 4:
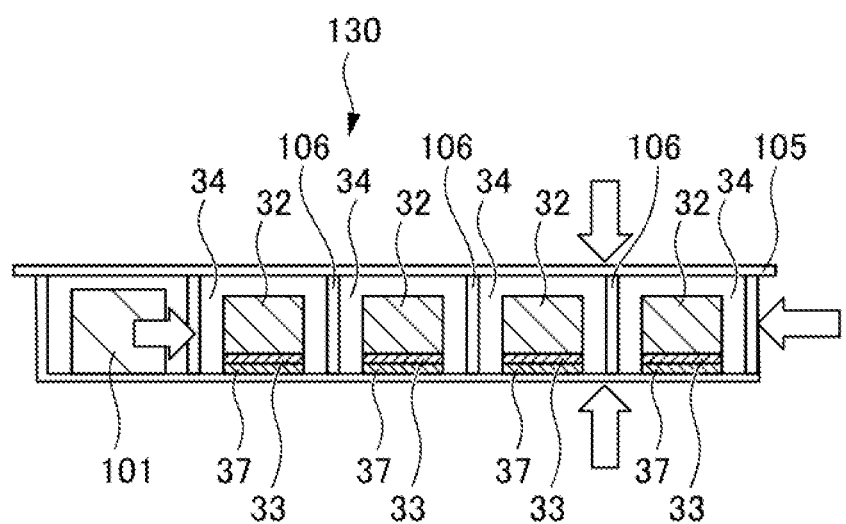
FIG. 4 is a view showing an electrolytic solution-based battery module layer 130 of the present invention.

FIG. 4 is a view showing the electrolytic solution-based battery module layer 130 of the present invention.

The electrolytic solution-based battery module layer 130 may have thermal insulation members 37 as shown in FIG. 4 between the casing 105 and the temperature adjustment system 33.

With this configuration, heat exchange with the casing 105 is also reduced, and therefore, the temperature adjustment system 33 functions more efficiently.

Of the casing 105, a portion relating to the solid-state battery module layer 110 will be referred to as a first space 115, and a portion relating to the electrolytic solution-based battery module layer 130 will be referred to as a second space 135.

The first space 115 has a support portion 106 extending in an upper-lower direction in FIGS. 3A to 3C and supporting the first space 115 in the upper-lower direction in FIGS. 3A to 3C.

With this configuration, the durability of the battery pack 100 against, e.g., impact from the outside can be improved, and electrolytic solution leakage from the electrolytic solution-based battery module 32 can be prevented.

That is, the durability and safety of the battery pack 100 are improved.

Prevention of the electrolytic solution leakage can prevent, for example, fire spread upon occurrence of automobile side collision on which the battery pack 100 is mounted.

The support portion 106 also preferably supports the first space 115 in a direction from a near side to a far side of the plane of paper of FIGS. 3A to 3C.

With this configuration, the strength of the solid-state battery module layer 110 is further improved, and the durability thereof is also improved.

The support portion 106 may have a solid-state battery or the solid-state battery module 102.

The mechanical strength of the solid-state battery itself can be utilized to form the support portion 106.

With this configuration, the volume of the solid-state battery in the battery pack 100 can be increased, and therefore, the energy density of the battery pack 100 is improved.

The first embodiment of the present invention has been described above.

Second Embodiment

Next, a second embodiment of the present invention will be described. A battery pack 200 according to the second embodiment of the present invention is different from the battery pack 100 according to the first embodiment in arrangement of solid-state battery modules 202 and electrolytic solution-based battery modules 232.

Figure 5:
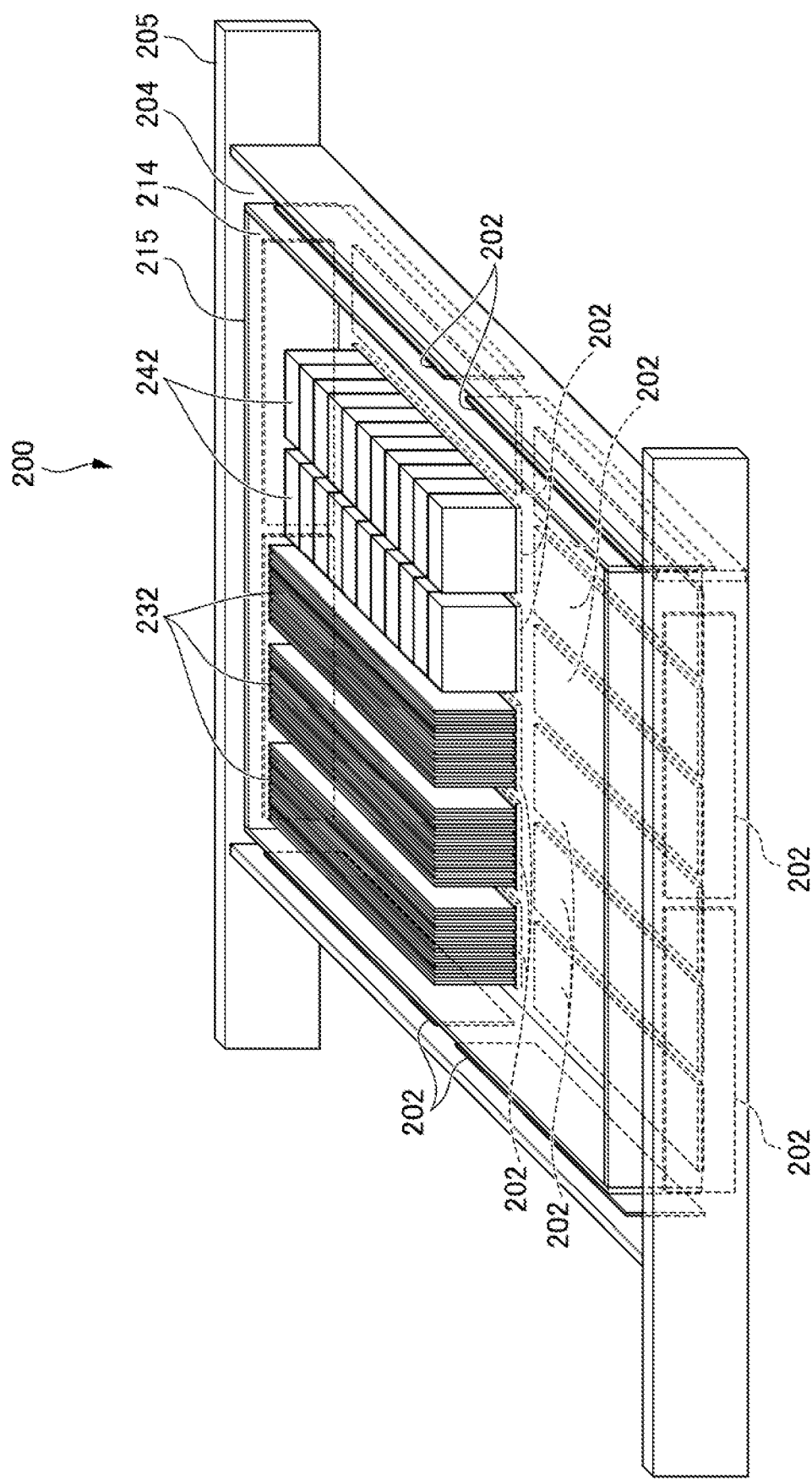
FIG. 5 is a view showing a battery pack 200 according to a second embodiment of the present invention.

FIG. 5 is a view showing a configuration of the battery pack 200 according to the second embodiment of the present invention.

FIG. 5 only shows side wall portions of a casing 205 and a casing 215, but actually, any of the casing 205 and the casing 215 has top and bottom plates perpendicular to each side wall portion. The battery pack 200 is formed in a double box shape.

Moreover, the top or bottom plate of the casing 215 includes a not-shown temperature adjustment system 213.

The inside of the casing 215 is a second space 214 in which the laminated cell type electrolytic solution-based battery modules 232 and metal can cell type electrolytic solution-based battery modules 242 are housed, the second space 214 being hermetically sealed with air in the assembly environment.

On the outside of the casing 215, the solid-state battery modules 202 are arranged to surround the electrolytic solution-based battery modules 232, 242 in the casing 215.

Further, the casing 215 is housed inside the casing 205, and a first space 204 between the casing 215 and the casing 205 is vacuumized. Note that in FIG. 5, the battery pack 200 includes both of the laminated cell type electrolytic solution-based battery module 232 and the metal can cell type electrolytic solution-based battery module 242, but cell selection of the electrolytic solution battery module is not particularly limited.

These modules may be used in combination, or only a single type of module may be used.

With this configuration, the solid-state battery modules 202 are used in combination with the electrolytic solution-based battery modules 232, 242, and therefore, the energy density and durability of the battery pack 200 can be improved as compared to the battery pack 10 only including the electrolytic solution-based batteries.

Further, the first space 204 is placed under vacuum environment, and therefore, exhibits high thermal insulation performance.

Thus, the starting performance is improved in the cold region, and the degradation is reduced in the tropical region. Further, the output relating to the temperature adjustment can be reduced, and therefore, the temperature adjustment system 213 can be more simplified.

In addition, in the battery pack 200, the solid-state battery module 202 is a high-output battery module, and the electrolytic solution-based battery modules 232, 242 are high-capacity battery modules.

The battery modules arranged inside and outside are separated by type, and upon high output or rapid charging, the solid-state battery module 202 as the high-output battery module is preferentially used.

The solid-state battery module 202 is preferentially used, and therefore, the heat generation amounts of the electrolytic solution-based battery modules 232, 242 can be reduced and degradation of these modules can be prevented.

Further, the solid-state battery module 202 is arranged outside and exhibits high performance for releasing heat to external air from the casing 205, and therefore, influence of heat transfer from the solid-state battery module 202 to the electrolytic solution-based battery modules 232, 242 through the casing 215 separating these modules is also small.

The second embodiment of the present invention has been described above.

The present invention is not limited to the first and second embodiments described above, and includes variations/modifications thereof.

For example, a plurality of battery packs 100, 200 of the above-described embodiments may be, as a variation of the present invention, coupled to each other upon use to increase a capacity.

The solid-state battery has high high-temperature durability, and has sufficient durability even in a high-capacity battery at a high temperature.

For example, the present invention can be, as an application thereof, mounted on a lower portion of a vehicle.

The solid-state battery module 102 with high high-temperature durability is arranged on the lower side of the vehicle so that degradation due to thermal radiation from a road surface can be reduced.

Further, the solid-state battery module 102 has the vacuum portion, and therefore, the thermal insulation performance is improved. Thus, the electrolytic solution-based battery module 32 can be protected.

In addition, the high-strength solid-state battery module 102 is also arranged on the side of the vehicle so that the electrolytic solution-based battery module 32 can be protected from impact such as a side collision. Electrolytic solution leakage is prevented, and the probability of fire spread is reduced.

EXPLANATION OF REFERENCE NUMERALS

10 Typical Battery Pack
11 Accessory
12 Battery Module
13 Temperature Adjustment System
14 Air
15 Casing
20 Typical Electrolytic Solution-Based Battery Pack
22 Electrolytic Solution-Based Battery Module
23 Temperature Adjustment System
24 Air
25 Casing
32 Electrolytic Solution-Based Battery Module
33 Temperature Adjustment System
34 Air
37 Thermal Insulation Member
100 Battery Pack
101 Accessory
102 Solid-State Battery Module
104 Vacuum Region
105 Casing
106 Support Portion
110 Solid-State Battery Module Layer
115 First Space
130 Electrolytic Solution-Based Battery Module Layer
135 Second Space
200 Battery Pack
202 Solid-State Battery Module
204 First Space
205 Casing
214 Second Space
215 Casing
232 Laminated cell Type Electrolytic Solution-Based Battery Module
242 Can Cell Type Electrolytic Solution-Based Battery Module

What is claimed is:

1. A battery pack comprising:
a solid-state battery module configured such that a plurality of solid-state battery cells containing a solid electrolyte is stacked; and
an electrolytic solution-based battery module configured such that a plurality of electrolytic solution-based battery cells containing an electrolytic solution is stacked,
wherein the solid-state battery module and the electrolytic solution-based battery module are combined and housed in the pack, and
the solid-state battery module is arranged to surround the electrolytic solution-based battery module.

2. The battery pack according to claim 1, wherein the solid-state battery module is arranged under vacuum environment.

3. The battery pack according to claim 1, wherein the solid-state battery module is a high-output battery module, and
the electrolytic solution-based battery module is a high-capacity battery module.

4. The battery pack according to claim 1, further comprising:
a solid-state battery module layer including a first space and the solid-state battery module arranged in the first space; and
an electrolytic solution-based battery module layer including a second space and the electrolytic solution-based battery module arranged in the second space,
wherein the solid-state battery module layer is arranged and stacked on the electrolytic solution-based battery module layer, and
the first space has a support portion supporting the first space at least in a stacking direction of the solid-state battery module layer.

5. The battery pack according to claim 4, wherein the support portion has a solid-state battery.

6. The battery pack according to claim 2, wherein the solid-state battery module is a high-output battery module, and
the electrolytic solution-based battery module is a high-capacity battery module.

7. The battery pack according to claim 2, further comprising:
a solid-state battery module layer including a first space and the solid-state battery module arranged in the first space; and
an electrolytic solution-based battery module layer including a second space and the electrolytic solution-based battery module arranged in the second space,
wherein the solid-state battery module layer is arranged and stacked on the electrolytic solution-based battery module layer, and
the first space has a support portion supporting the first space at least in a stacking direction of the solid-state battery module layer.

8. The battery pack according to claim 3, further comprising:
a solid-state battery module layer including a first space and the solid-state battery module arranged in the first space; and
an electrolytic solution-based battery nodule layer including a second space and the electrolytic solution-based battery module arranged in the second space,
wherein the solid-state battery module layer is arranged and stacked on the electrolytic solution-based battery nodule layer, and
the first space has a support portion supporting the first space at least in a stacking direction of the solid-state battery module layer.

9. The battery pack according to claim 7, wherein the support portion has a solid-state battery.

10. The battery pack according to claim 8, wherein the support portion has a solid-state battery.

11. The battery pack according to claim 9, wherein the support portion has a solid-state battery.

* * * * *